United States Patent [19]

Guarnerio

[11] 4,402,258
[45] Sep. 6, 1983

[54] TOASTER AND ELECTRIC CONTROL THEREFOR

[76] Inventor: Renato Guarnerio, Via G. Forni, 72, 20161 Milano, Italy

[21] Appl. No.: 191,933

[22] Filed: Sep. 29, 1980

[51] Int. Cl.³ .............................................. A47J 37/08
[52] U.S. Cl. ......................................... 99/393; 99/327
[58] Field of Search ............... 99/328, 327, 334, 335, 99/329 R, 328, 391, 393

[56] References Cited

U.S. PATENT DOCUMENTS

| 1,596,081 | 8/1926 | Coleman | 99/391 |
| 2,260,043 | 10/1941 | Middleton | 99/391 |
| 2,512,503 | 6/1950 | Robinson | 99/393 |
| 2,724,322 | 11/1955 | Parr | 99/327 |
| 3,531,231 | 9/1970 | Kawamura | 99/393 |
| 3,669,002 | 6/1972 | Davidson | 99/327 |

Primary Examiner—Billy J. Wilhite
Attorney, Agent, or Firm—Stevens, Davis, Miller & Mosher

[57] ABSTRACT

A device for the automatic introduction and extraction of the slices of bread in a toaster, in which the slice-carrying supports are led into a vertical up and down movement by two identical leverages, associated with the opposed ends of the supports themselves and operated in parallel by an electric motor.

4 Claims, 5 Drawing Figures

TOASTER AND ELECTRIC CONTROL THEREFOR

BACKGROUND OF THE INVENTION

The present invention relates to an improved toaster, which comprises an electromechanical mechanism allowing the automatic introduction and extraction of the slices of bread.

The toasters at present on the market may be substantially divided in two categories. Those wherein the slice-carrying supports are extractable from the body of the apparatus, and in this case the slices are introduced by hand, and those wherein the supports are incorporated in the apparatus and comprise an automatic ejection mechanism connected to the timer which sets the toasting time.

The toasters belonging to the first of the above categories evidently require a constant attention of the operator, who must introduce the bread slices to be toasted, watch the toasting thereof and finally provide for their extraction, and the results obtained are not always the best as far as toasting degree and uniformity.

These drawbacks are partly overcome by toasters belonging to the second of the above categories, which however have the drawback—especially when toasting single slices of bread which are consequently lighter—of an exceedingly violent ejection which consequent falling of the slices out of the toaster.

SUMMARY OF THE INVENTION

The purpose of the present invention is to overcome the heretofore mentioned drawbacks and inconveniences by conceiving a toaster which provides all the advantages of an automatic use—such as the toasting uniformity and precision to the desired degree, together with the lack of any control by the operator (this last factor being particularly desirable in public refreshment-rooms)—while guaranteeing, on the other hand, a particularly smooth ejection of the slices from the toaster, after toasting is complete, independently from the weight of the slice or slices of bread being toasted.

The object of the present invention is a device for the automatic introduction and extraction of the slices of bread in a toaster, characterized in that the slice-carrying supports are led into a vertical up and down movement by two identical leverages, associated with the opposed ends of the grippers themselves and operated in parallel by an electric motor.

Each leverage is formed by three toggle-joint levers, being hinged at one end onto the frame of the toaster and at the other end onto a crossbar supporting the slice-carrying supports, and by a pair of levers hinged onto the toggle pins of said toggle-joint levers, said leverage being operated by a rotating pin sliding into a slot provided in one of said levers.

Said device is moreover fed and controlled by an electric circuit, wherein the toasting resistances and the motor are connected in parallel, with one of their clamps being connected directly to a first pole of the network, the second pole of the network being connectable alternatively to one or the other of the two contacts of a first switch, said two contacts being in turn bridge connected with two equivalent contacts of a second switch, these latter being in turn alternatively connectable with the other clamp of the motor, while the other clamp of the resistances is connected to one of the two bridges connecting the contacts of said switches.

Said first and said second switch are operated, respectively, by a manually or electronically controlled timer and by a cam fixed to the reduction gear of the motor.

BRIEF DESCRIPTION OF THE DRAWINGS

The invention will anyhow be described in detail hereinafter, with reference to a preferred embodiment thereof, given however by mere way of example and referring to the accompanying drawings, in which.

DESCRIPTION OF THE PREFERRED EMBODIMENT

Figure 1:
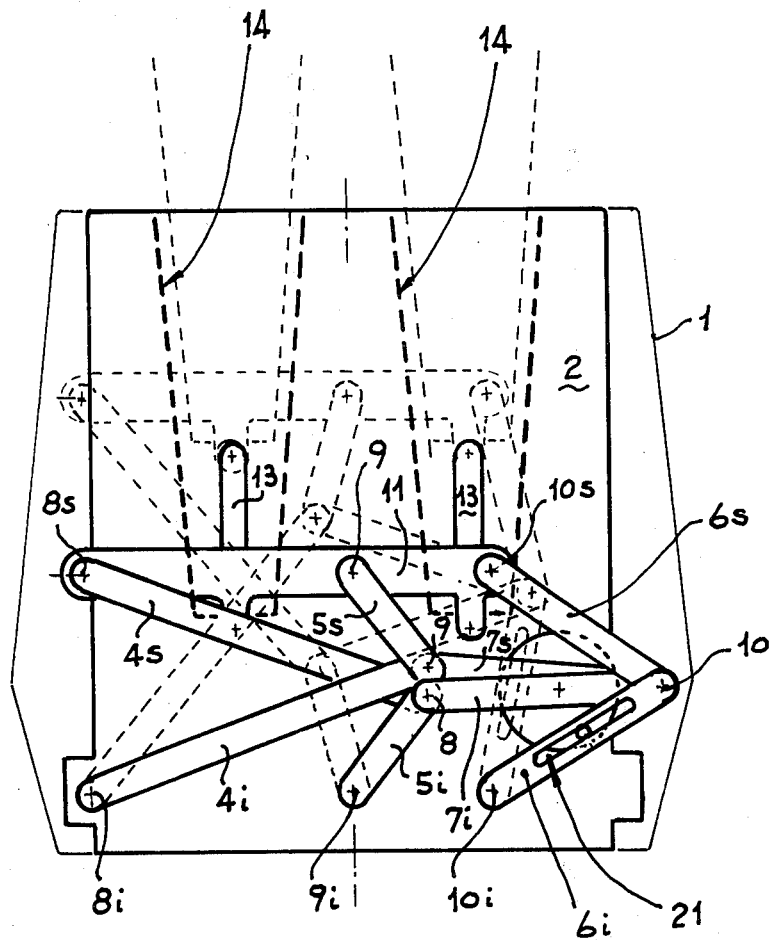
FIG. 1 shows a schematic view of one of the sides of the toaster according to the present invention, without cover plate and motor unit.
Figure 2:
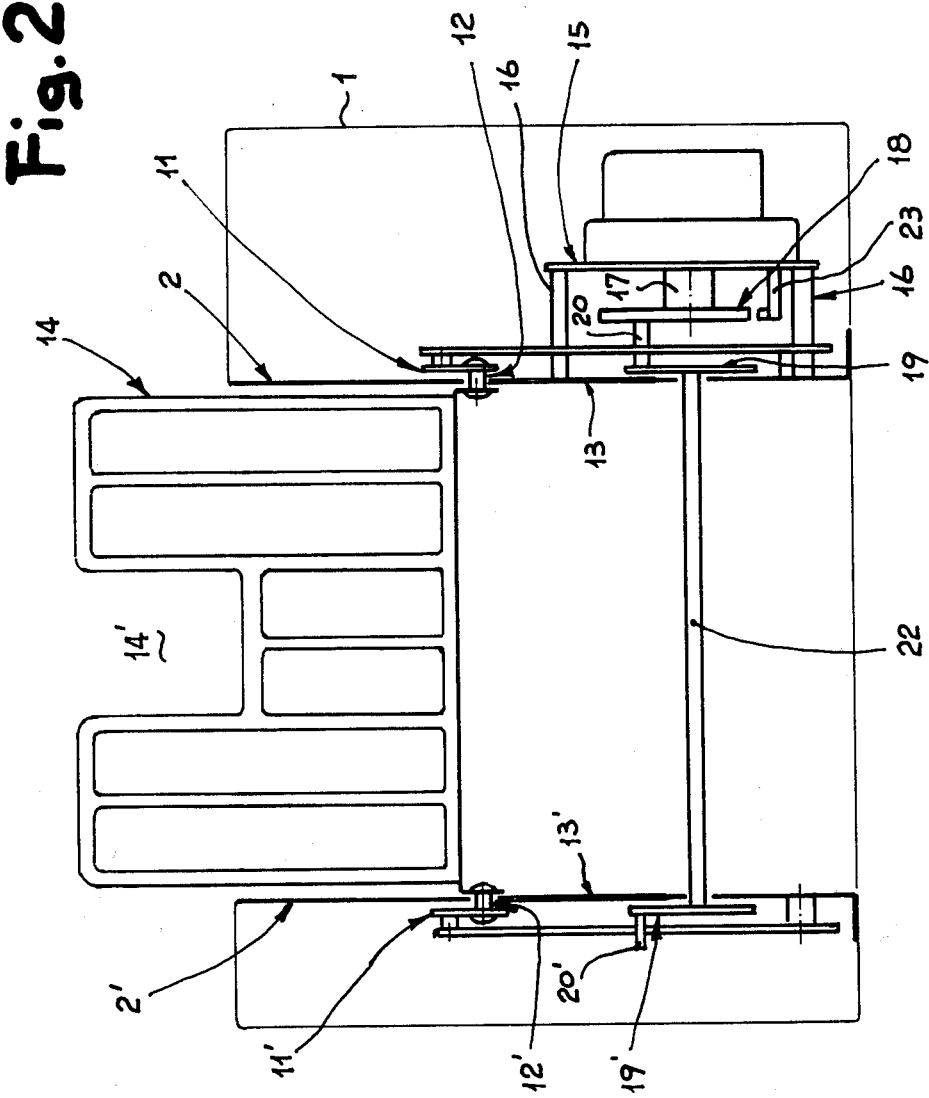
FIG. 2 is a schematic view, in longitudinal section, of the same toaster with the slice-carrying supports in a raised position.

As shown in FIGS. 1 and 2, the toaster according to the present invention is formed by an outer casing 1, to which are fixed two inner walls 2 and 2' acting as a frame to support the equipment. The two walls 2 and 2' with the respective mechanisms applied thereto are perfectly symmetrical, and the following description will hence be given with reference to the wall 2 shown in FIG. 1.

On the outer face of said wall 2 and in its lower part there are hinged three toggle-joint levers formed by:

three lower levers $4i$, $5i$, and $6i$, rotating on the fixed pins $8i$, $9i$, and $10i$, which are arranged along a horizontal line, and three lower levers $4s$, $5s$, and $6s$, being hinged in $8s$, $9s$ and $10s$, onto a crossbar 11 for the support of the slice-carrying supports. The levers $4i$ and $5s$, $4s$ and $5i$ and $6i$ and $6s$ are identical in overall length.

Provision is also made of a pair for levers $7i$ and $7s$, which are hinged to the previous levers into the three mobile hinges 8, 9 and 10, forming the toggles of the heretofore described toggle-joint levers $4i$-$5s$, $5i$-$4s$ and $6i$-$6s$, respectively.

The set of levers 4, 5, 6 and 7, and the supporting crossbar 11, form an articulated leverage allowing the crossbar 11 to move up and down, always remaining parallel to itself and to the horizontal line passing through the three pins $8i$, $9i$ and 10.

The lower part of the crossbar 11—as well as that of the similar crossbar 11' of the articulated leverage on the wall 2'—is provided with guiding pins 12 and 12' respectively, which slide in vertical guide slots 13 and 13', formed on walls 2 and 2'. Said pins are designed to support the slice-carrying supports 14, which therefore follow the movement imparted by the leverage to the supporting crossbars 11 and 11'.

The movement of the whole leverage is controlled by an electric motor, through a reduction gear with high speed reduction. The geared motor M is mounted onto a support plate 15, fixed to the wall 2 through a set of spacers 16. A cam disc 18 is keyed onto the shaft 17 of said geared motor M, said cam disc 18 being connected, through an eccentrically located pin 20, to a disc 19 which faces the cam itself and is coaxial thereto. The cam 18 and the disc 19 are arranged on opposite sides in respect of the leverage 4, 5, 6, 7, provided on the wall 2, and the pin 20 connecting them crosses a longitudinal slot 21 formed in the lever 6i (see FIG. 1). An identical disc 19' having a pin 20' is provided between the wall 2' and the articulated leverage on said wall, and is connected to the disc 19 by means of a shaft 22. The rotation of the discs 19 and 19'—controlled by the geared motor M, through the cam 18 and the pin 20—causes, through the cooperation between pins 20, 20' and slots 21, 21', the shifting of the levers 6i and 6i' and of the whole leverage connected thereto, and consequently the lifting or lowering of the slice-carrying supports 14 between the two end positions shown in FIG. 1 (which correspond to the two positions in which the lever 6i is substantially tangent—on one side and, respectively, on the other side—to the disc 19).

The cam 18, while rotating, is adapted to operate the switch 23, the operation of which will be made more clear hereinafter.

The electric circuit for feeding and controlling the heretofore illustrated device will now be described in detail, and some possible variant embodiments thereof will also be shown.

Figure 3:
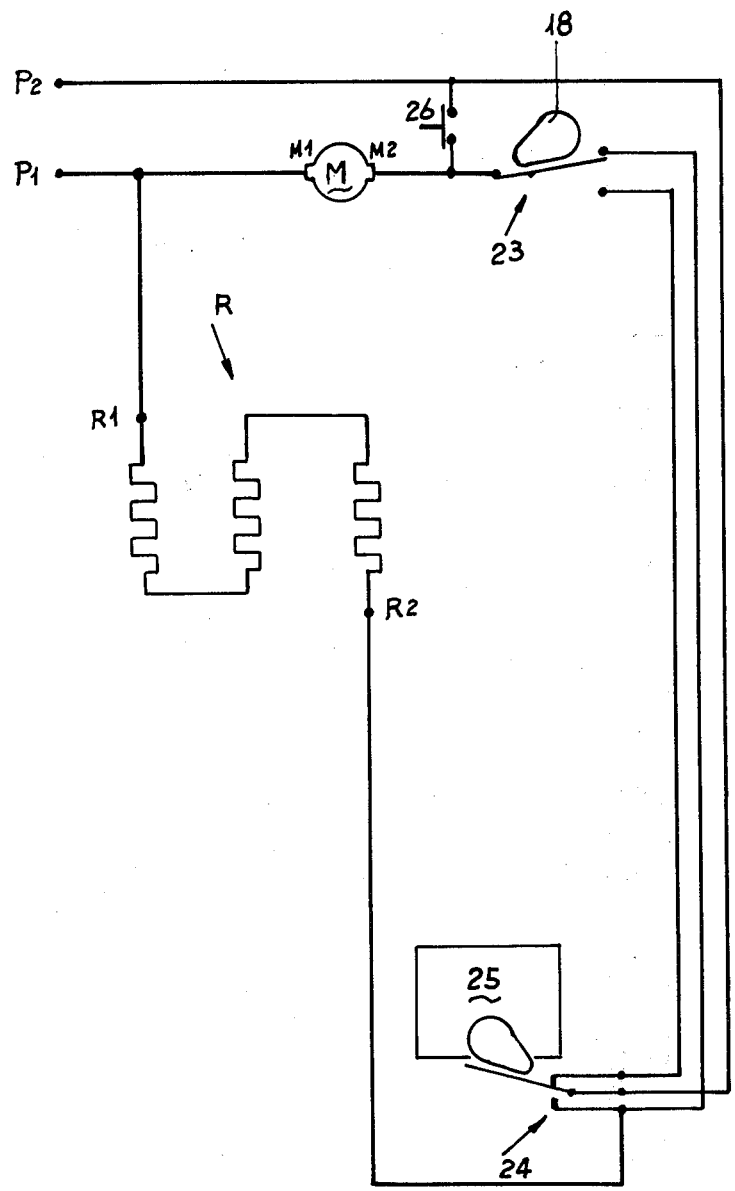
FIG. 3 is a preferred electric circuit for feeding and controlling the device according to the present invention.

As shown in FIG. 3, the electric circuit comprises the geared motor M and the group of toasting resistances R. The geared motor and the resistances are connected in parallel to the pole P1 of the network with their respective clamps M1 and R1. The clamp M2 is connected to the contactor of the switch 23, the two contacts of which are bridge connected with the equivalent contacts of a switch 24, the contactor of which is connected to the pole P2 of the network. The pole R2 is instead directly connected to one of the two bridge circuits which connect said switches 23 and 24. The switch 24 is operated by a manual timer 25 of known type. A push button 26 is finally provided for closing at any time the circuit feeding the geared motor M.

The working of the heretofore illustrated equipment according to the present invention will now be shortly described.

In a position of rest, the toaster 1 is kept with its slice-carrying supports 14 in a re-entered position. At the moment of use, after connection to the electric network, by pressing the push button 26, the geared motor M starts to work; as previously specified, said geared motor M operates the leverages and the crossbars 11, 11' supporting the supports 14, which latter are thus driven upwards, outside the apparatus, with a gradual movement. At this stage, the slices of bread to be toasted are introduced therein and the desired toasting time is set on the timer 25. The timer 25 immediately closes the switch 24 and current is hence fed to the toasting resistances R as well as to the geared motor M. The slice-carrying supports 14 start to move downwardly until the cam 18, fixed to the reduction gear and appropriately shaped, operates the switch 23 disconnecting the geared motor M. At this point, the slices to be toasted find themselves within the toasting chamber of the toaster, wherein they stay until the timer 25, at the end of the planned toasting time, again operates the switch 24 bringing it back to the initial position. At this stage, the resistances R are at once disconnected, while—thanks to the position taken up by the switch 23—the geared motor M is fed, thereby allowing the removal of the toasted slices from the casing 1 of the toaster and leaving the apparatus ready for a new toasting cycle.

It should be noted that the slice-carrying supports 14 are formed with a central window 14', allowing an easier grip of the toasted slices of bread.

Figure 4:
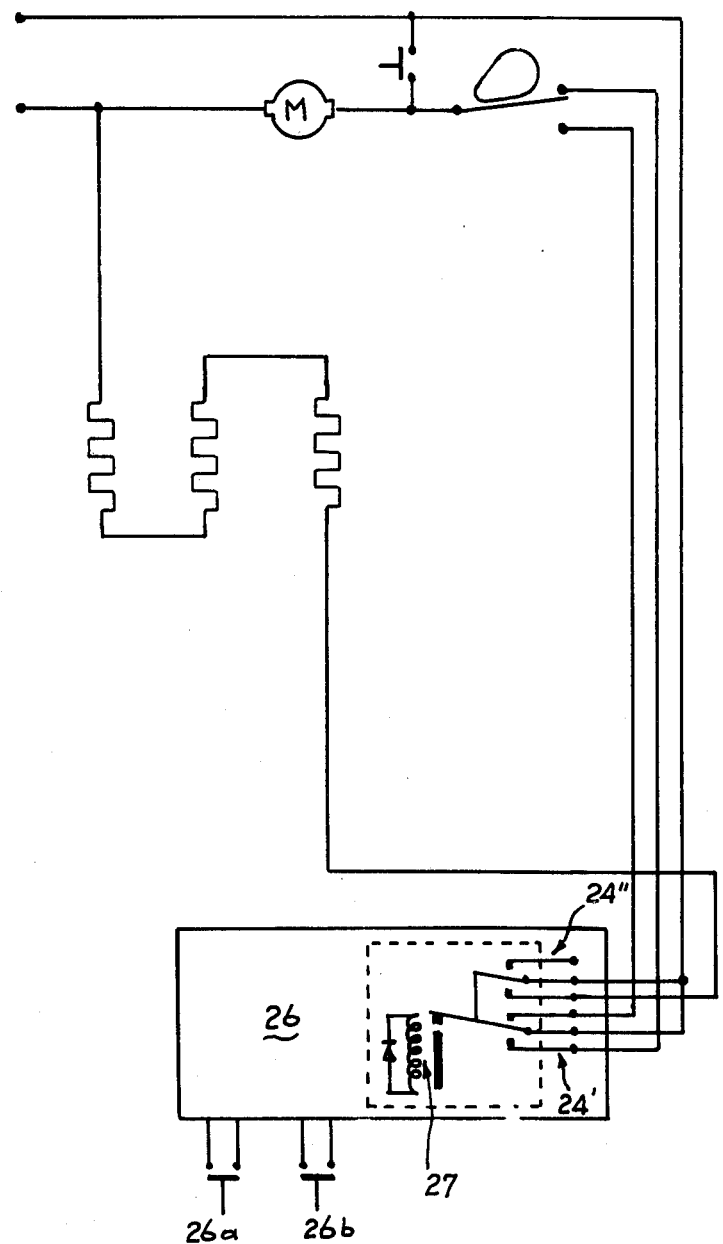
FIGS. 4 and 5 show two different embodiments of said electric circuit.

In the embodiment shown in FIG. 4, the manual timer 25 is replaced by an electronic timer 26 which, through a relay 27, operates the switch 24. In the embodiment shown in FIG. 4, the switch 24 has been replaced by a switch 24' which controls only the circuit of the geared motor M, and by a switch 24" which controls only the circuit of the resistances R. The electronic timer 26 is provided with two external push buttons 26a and 26b, the first of which operates the relay, while the second one is used to interrupt at once the automatic cycle.

Figure 5:
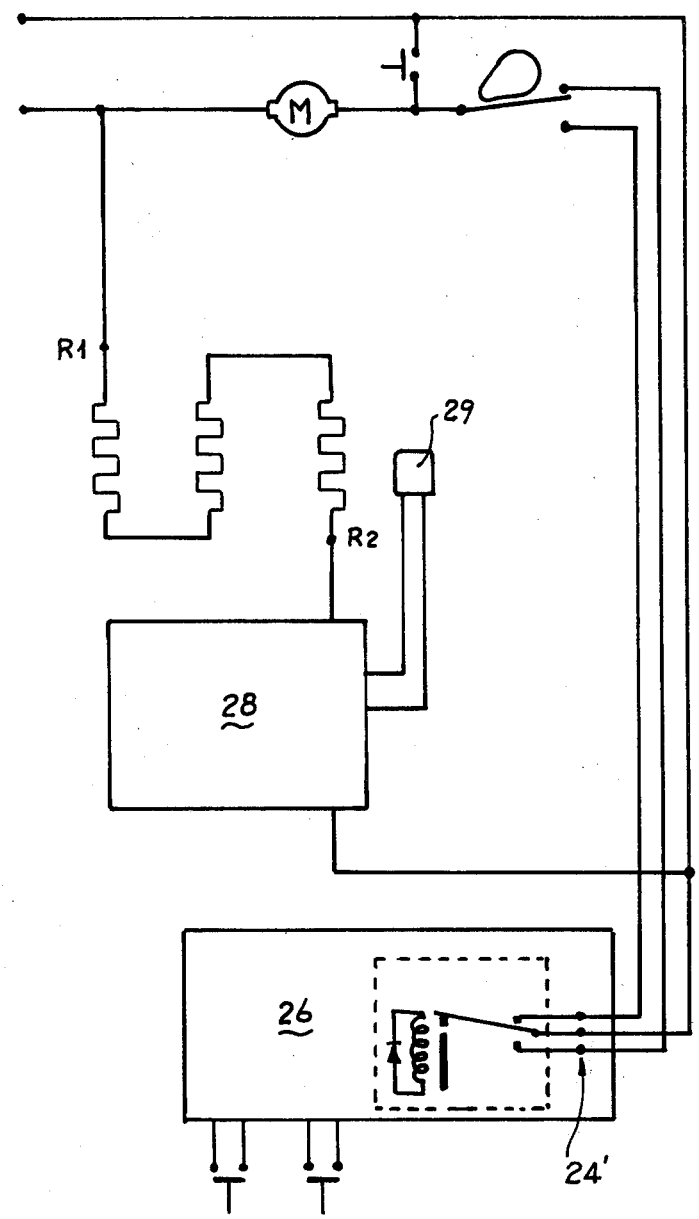

Finally, in the last embodiment shown in FIG. 5, the clamp R2 of the resistances is directly connected to the pole P2 of the network, through a thermostatic switch 28 having a feeler 29 placed inside the toasting chamber of the toaster. In this latter case, when the general switch (not shown) is turned on, the resistances remain connected and they are automatically controlled by the switch 28, which thus maintains a desired constant toasting temperature within the toasting chamber. This last embodiment is obviously particularly suited when having to make a constant and lengthened use of the toaster, as may actually be done in public refreshment-rooms.

It is anyhow understood that the invention is not limited to the particular embodiment heretofore described and illustrated, but that there may be many variants differing from the same, all within reach of an expert in the field, but all falling within the protection scope of the invention itself.

I claim:

1. Toaster device for the automatic introduction and extraction of slices of bread comprising a toaster frame; slice-carrying supports movable in a vertical upwardly and downwardly direction; two identical leverages positioned on opposed ends of said supports to move said supports and an electric motor to operate said leverages in parallel, each said leverages being formed by three toggle-joint levers, hinged at one end to the frame and a pair of levers hinged to toggle pins of said toggle-joint levers, said supports carrying a crossbar at each end to which is attached the other end of said toggle-joint levers.

2. A toaster device of claim 1 including a reduction gear with high speed reduction carried by said motor, said motor controlling the leverage moving the supports.

3. Toaster device for the automatic introduction and extraction of slices of bread comprising a toaster frame; slice-carrying supports movable in a vertical upwardly and downwardly direction; two identical leverages positioned on opposed ends of said supports to move said supports; an electric motor to operate said leverages in parallel; a reduction gear carrying a first shaft mounted on said motor; first, second and third discs; said first disc fixed to said first shaft of said reduction gear; a second shaft interconnecting said second and third discs coaxial to said first shaft; a first pin mounted eccentrically on said first and second discs and parallel to said first and second shafts; a second pin fixed to said third disc symmetrical to said first pin, said leverages defining slots therein into which said first and second pins slide for operating said leverages; said discs being parallel to each other and to the planes of movement of the leverages; said first disc being in the form of a cam.

4. The toaster device of claim 3 including third and fourth pins on said supports perpendicular thereto and wherein said frame defines slots therein in which said third and fourth pins slide.

* * * * *